United States Patent [19]

Hatton

[11] Patent Number: 4,630,465
[45] Date of Patent: Dec. 23, 1986

[54] LOW VISCOUS DRAG KNOCK SENSOR

[75] Inventor: Bruce M. Hatton, Carol Stream, Ill.

[73] Assignee: Eaton Corporation, Cleveland, Ohio

[21] Appl. No.: 672,402

[22] Filed: Nov. 19, 1984

[51] Int. Cl.⁴ .............................................. G01L 23/22
[52] U.S. Cl. .......................................... 73/35; 73/651;
310/324
[58] Field of Search ..................... 73/35, 517 AV, 651;
310/312, 321, 324; 123/425, 435

[56] References Cited

U.S. PATENT DOCUMENTS

| 3,148,290 | 9/1964 | Dranetz et al. | 310/329 |
| 4,193,647 | 3/1980 | Guess et al. | 310/324 |
| 4,307,602 | 12/1981 | Sawada et al. | 73/35 |
| 4,336,707 | 6/1982 | Yamaguchi et al. | 73/35 |
| 4,341,189 | 7/1982 | Yamaguchi et al. | 73/35 X |
| 4,371,804 | 2/1983 | Peng et al. | 310/321 |
| 4,374,472 | 2/1983 | Nishimura | 73/35 |

Primary Examiner—Stephen A. Kreitman
Assistant Examiner—Scott M. Oldham
Attorney, Agent, or Firm—Fay, Sharpe, Fagan, Minnich & McKee

[57] ABSTRACT

A housing (A) which is connected with an internal combustion engine to be vibrated therewith. A diaphragm (B) is mounted in an interior chamber of the housing to undergo vibration therewith. The diaphragm is constructed to have a natural resonant frequency which substantially matches the knock frequency of the engine model for which the knock sensor is designed. The diaphragm is mounted to the housing by a central portion (20) such that an edge portion (24) undergoes maximum resonant displacement. To facilitate the passage of air from one side of the diaphragm to the other during near resonant displacement, a plurality of apertures (26) are provided through the diaphragm edge portion. In this manner, viscous drag is reduced which increases the magnitude of the resonant displacement and decreases the bandwidth or range of frequencies over which the diaphragm undergoes significant displacement. A piezoelectric element (30) is connected with the diaphragm to provide an electrical output signal which varies with the diaphragm displacement.

14 Claims, 6 Drawing Figures

LOW VISCOUS DRAG KNOCK SENSOR

BACKGROUND OF THE INVENTION

The present invention relates to apparatus for detecting acceleration, physical displacement, vibration, and the like. It finds particular application in conjunction with apparatus for sensing knocking in internal combustion engines and will be described with particular reference thereto. It is to be appreciated, however, that the invention is also applicable for sensing other physical conditions, particularly those which are marked by a predetermined, characteristic frequency, or frequency bandwidth, such as sensors for wheel shimmy, aircraft component vibration, bearing failures, and the like.

With the advent of high speed electronic engine control circuitry and the quest for greater internal combustion engine efficiency, internal combustion engines have come to be operated close to conditions with cause pre-ignition combustion or knocking. With changes in operating parameters, such as engine load, temperature, fuel, and the like, the internal combustion engine may begin to knock. Knocking, of course, sends vibration or shock waves through the engine which cause excessive engine wear, damage, and premature engine failure.

With adjustments in engine timing and other operating conditions, a knocking condition can be reduced or eliminated. Under some circumstances, a small amount of engine knock has been found to be desirable. To this end, others have suggested monitoring internal combustion engines for knock and adjusting timing and other operating parameters in order to eliminate knock or hold it in an acceptable range. One such system is shown in U.S. Pat. No. 4,474,472 issued Feb. 22, 1983 to Toshifumi Nishimura and another is described in U.S. Pat. No. 4,371,804 issued Feb. 1, 1983 to Yuchi Peng et al.

One of the problems with the above-referenced knock sensors is that they lack frequency selectivity. The Peng, et al. patent intentionally designs the sensor to be responsive to a broad range of frenquencies in order to accomodate a wide range of engine sizes and models. This broad frequency sensitivity increases the difficulty in distinquishing between engine knock and vibrations from other engine components, vehicle parts, road vibration, and the like. Responding to stray vibrations, as if they were engine knock, not only degrades engine performance, but can cause stalling, loss of power, and other potentially dangerous results.

The present invention provides an engine knock sensor which is responsive to a narrow frequency band to reduce sensitivity to stray engine and vehicle vibrations.

SUMMARY OF THE INVENTION

In accordance with a first aspect of the present invention, a low viscous drag knock sensor is provided. A sensor housing which defines an interior cavity is configured to be operatively connected with an internal combustion engine. A diaphragm having a natural resonant frequency is mounted in the housing cavity on a diaphragm mounting member. As the diaphragm undergoes vibratory displacement over a preselected frequency bandwidth, the bandwidth is broadened by damping interaction between the diaphragm and air in the cavity. To reduce the damping effect of the air, the diaphragm defines drag reducing surface portions, e.g. apertures, to facilitate the passage of air therearound. In this manner, the viscous drag of the air on the diaphragm is reduced, narrowing the bandwidth and increasing the amplitude of the resonant displacement. A piezoelectric element is operatively connected with the diaphragm to produce an output electrical signal which varies in proportion to the resonant displacement.

In accordance with another aspect of the present invention, a motion sensor is provided. A diaphragm is mounted in an interior cavity of a sensor housing. The diaphragm has a natural resonant frequency such that it undergoes resonant displacement over a frequency bandwidth encompassing the resonant frequency. A bandwidth reducing means reduces the diaphragm bandwidth by reducing drag from the air flowing around the diaphragm during resonant displacement. A sensing means senses the resonant displacement of the diaphragm and produces an output indicitive thereof.

A primary advantage of the present invention is that it distinquishes accurately between engine knock and stray vibrations.

Another advantage of the present invention is that it achieves a higher output amplitude. Another advantage of the present invention is that it achieves a greater signal to noise ratio.

Yet another advantage of the present invention is that it is sensitive to a relatively narrow frequency bandwidth.

Still further advantages of the present invention will become apparent to those of ordinary skill in the art upon reading and understanding the following detailed description of the preferred embodiment.

BRIEF DESCRIPTION OF THE DRAWINGS

The invention may take form in various parts and arrangements of parts or in various steps and arrangements of steps. The drawings are only for purposes of illustrating a preferred embodiment of the invention and are not to be construed as limiting it. Wherein the figures show.

DETAILED DESCRIPTION OF THE PREFERRED EMBODIMENT

Figure 1:
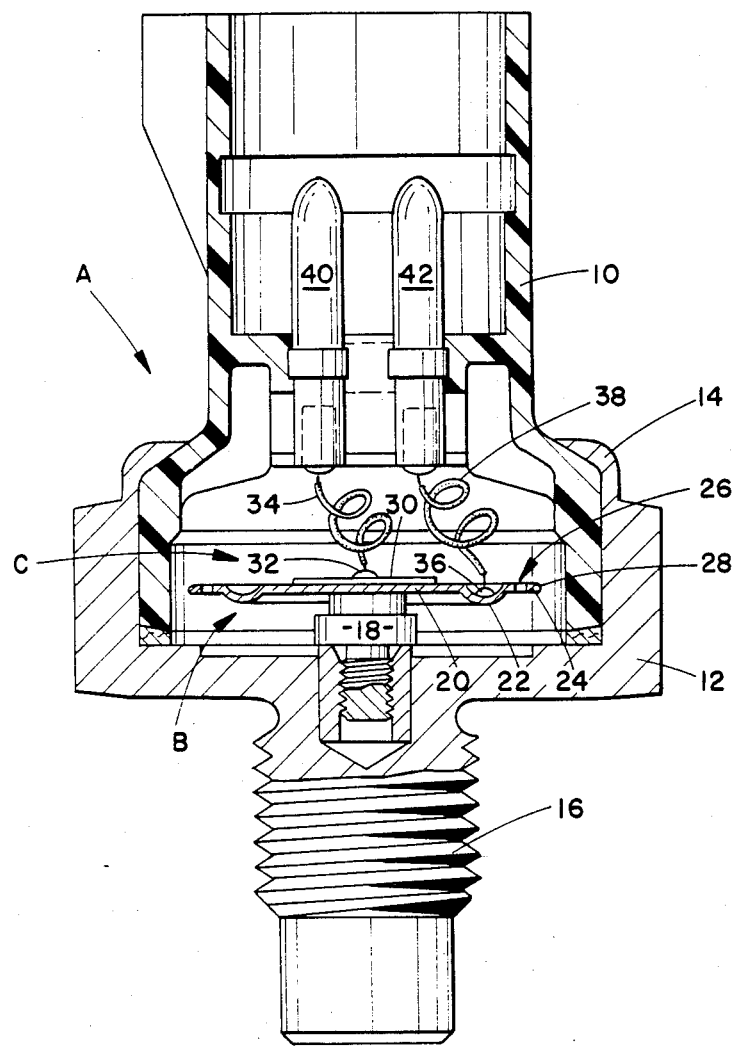
FIG. 1 is a sectional view of a knock or motion sensor in accordance with the present invention.

With reference to FIG. 1, the knock or movement sensor includes a housing A which defines an interior chamber therein. A diaphragm B is mounted in the housing chamber to undergo movement or vibration with the housing. A diaphragm motion sensing means C senses the movement of the diaphragm relative to the housing and provides an output indicitive thereof.

The housing A includes an upper, plastic housing portion 10 and a lower, metal housing portion 12. A crimped metal flange 14 seals and holds the upper and lower housing portions together. A threaded seam 16 is adapted to be mounted in an intake manifold or other structure which is vibrationally connected with an internal combustion engine. A diaphragm mounting member or means 18 such as a post which is threadedly connected at one end with the lower housing and configured at its other end to receive the diaphragm is disposed in the housing chamber.

Figure 2:
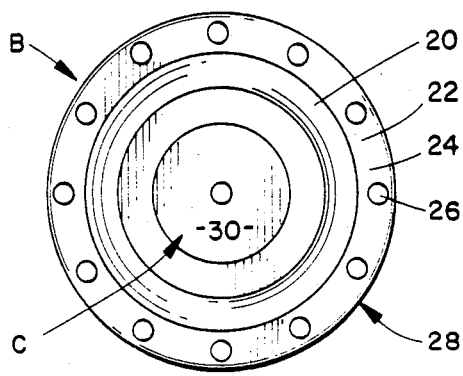
FIG. 2 is a top plan view of the diaphragm and piezoelectric transducer of FIG. 1.

With continuing reference to FIG. 1 and particular reference to FIG. 2, the diaphragm B includes a mounting or central portion 20 surrounded by a stiffening rib 22 and an edge or movable portion 24. The diaphragm has a natural resonant frequency which is selected in coordination with the knock frequency of the specific engine model for which the knock sensor is designed. The diaphragm resonant frequency is selected by altering the contour of the stiffening rib 22. For example, increasing the height of the stiffening rib increases the stiffness of the diaphragm, hence raises the resonant frequency. Analogously, reducing the height of the stiffening rib renders the diaphragm more floppy and lowers the resonant frequency.

In the preferred embodiment, the diaphragm mounting portion 20 is configured to be mounted on the diaphragm mounting post 18. The diaphragm movable portion 24 is unrestrained and free to vibrate. When the housing A is vibrated, the vibrations are transmitted to the diaphragm which vibrates as well. As the diaphragm vibrates, the edge portion 24 undergoes cyclical displacement, i.e., vibrates. The magnitude of the displacement is relatively small, except near the resonant frequency of the diaphragm. In a frequency bandwidth adjacent the resonant frequency, the magnitude of displacement of the movable edge portion increases dramatically.

As the diaphragm undergoes near resonant and resonant displacement, the air in the housing chamber is forced to flow therearound. The relatively large quantities of air moved during resonant displacement relative to the quantity of air moved during non-resonant vibration or displacement provide a viscous drag on the diaphragm. The viscous drag reduces the amplitude of the resonant displacement and broadens the bandwidth of the diaphragm, i.e., increases displacement at frequencies more significantly different from the resonant frequency. To reduce the bandwidth, the diaphragm defines drag reducing surface portions which are configured to enhance the air flow thereover. The drag reducing surface portions decrease the damping interactions between the diaphragm and the air to function as a means for reducing the bandwidth. In the preferred embodiment, the drag reducing surface portions include a plurality of apertures 26 in the diaphragm edge portion to provide a passage for air therethrough. The apertures enable a portion of the air or other fluid in the chamber to move through the diaphragm edge portion 24 rather than being displaced therearound. To reduce the drag from the portion of the air which flows around the diaphragm, an outer peripheral edge 28 of the diaphragm is rounded to provide a smooth, relatively corner free surface over which the displaced air may flow.

Referring primarily to FIG. 1, the diaphragm movement sensing means C includes a piezoelectric wafer or disc 30 which is disposed adjacent the diaphragm central portion to be flexed with the vibrational displacement of the diaphragm. The piezoelectric wafer is oriented such that a voltage across its flat faces is generated generally in proportion to the magnitude of the strain induced in the piezoelectric wafer as a result of the diaphragm displacement. A first electrical contact 32, such as a solder bead, mechanical fastener for fastening the piezoelectric wafer and diaphragm to the mounting member, or the like, is connected with a first electrical lead 34 and one face of the piezoelectrical disc. The diaphragm functions as an electrical contact from the opposite face of the piezoelectric disc. A second electrical contact 36 is supported by the diaphragm for interconnection with a second electrical lead wire 38. In the preferred embodiment, the second electrical contact is a solder bead which is disposed in the stiffening rib which is relatively insensitive to movement. The lead wires are electrically connected with tines 40 and 42 mounted in the plastic housing portion to define an electrical plug. Electrical cables of standard design connect the electrical plug with the appropriate electronic control system of the engine.

Increasing the size and number of apertures not only reduces the drag but also reduces the mass of the diaphragm. As the diaphragm mass decreases, the flexing and electrical output of the piezoelectric wafer also decrease. Preferably, the diaphragm defines twelve symetrically disposed apertures whose combined area represents 8% of the diaphragm edge portion between the center of the stiffening rib and the outer peripheral edge. However, decreasing the aperture area to 5% or increasing the aperture area to 10% of the diaphragm edge portion decreases the electrical output less than about 15% relative to the output with the 8% preferred aperture area.

Optionally other sensing means can be utilized to sense the magnitude of the diaphragm displacement and produce a corresponding output signal. For example, a light beam aimed at an optical sensor or array of sensors can be broken or deflected by the displaced diaphragm. As another example, an inductive or capacitive sensor may sense relative proximity of the diaphragm edge portion. Further, an optical or audio phase shift, sonar echoes, mechanical interaction, and the like may be utilized to sense diaphragm displacement.

Figure 3:
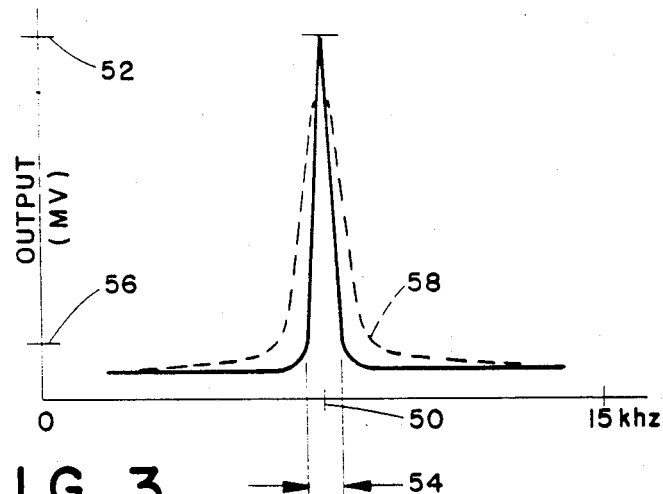
FIG. 3 is a diagramatic illustration of sensor output versus input frequency.

With reference to FIG. 3, the electrical output of the piezoelectric wafer 30 varies as a function of diaphragm displacement which, in turn, varies as a function of frequency. When the diaphragm is vibrated at a frequency significantly below a resonant frequency 50 or significantly above the resonant frequency, the voltage output across the plug tines is relatively low. At the resonant frequency, the electrical output increases by better than an order of magnitude; reaching an apex or maximum output 52 at the resonant frequency 50. In the preferred embodiment, the resonant frequency 50 is selected to match the knock frequency of a specific engine model, generally in the range of 5 to 9 kilohertz. In a narrow frequency range or bandwidth 54 to either side of the resonant frequency, the diaphragm undergoes significant displacement and the electrical output is significantly elevated. The high resonant response and narrow bandwidth connote a system with a high Q. In the preferred embodiment, at an output level 56 which is about three decibels below the maximum output level 52, the bandwidth 54 has a width of between 70 and 200 hertz. Without the drag reducing apertures 26, the output voltage versus input frequency curve would be more as illustrated by phantom curve 58 with a lower peak output and a wider bandwidth; i.e. a relatively low Q.

Figure 4:
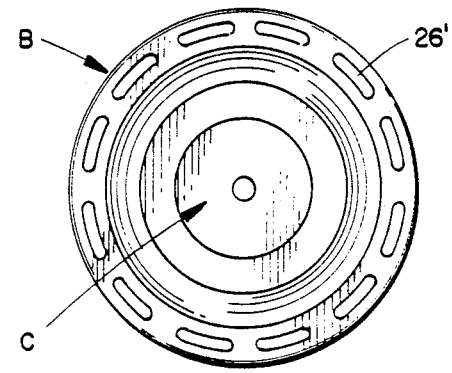
FIG. 4 is a top plan view of an alternate embodiment of the diaphragm and piezoelectric transducer.
Figure 5:
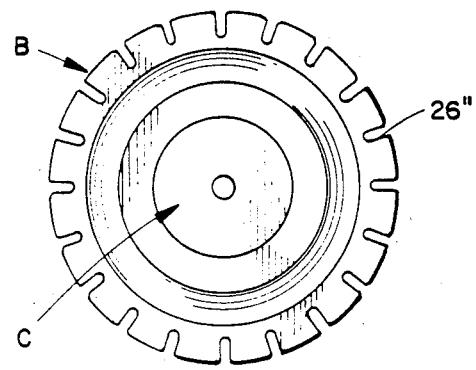
FIG. 5 is a top plan view of another alternate embodiment of the diaphragm and piezoelectric transducer; and, FIG. 6 is a top plan view of yet another alternate embodiment of the diaphragm a piezoelectric transducer.
Figure 6:
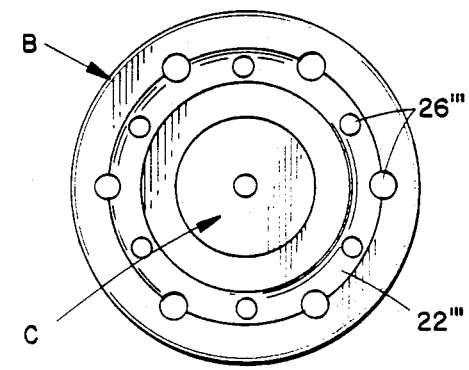

Although the apertures are shown in the embodiment of FIG. 2 as a regularly spaced array of circular bores, it is to be appreciated that other aperture configurations are also contemplated. For example, as illustrated in FIG. 4, the apperatures may include elongated, circumferentially extending slots 26'. As another option illustrated in FIG. 5, the apertures may include a plurality of slots or recesses 26' extending inward from the outer pheriphery of the diaphragm. The generally U or V-shaped cross section of the stiffening rib tends to channel and direct the air as the diaphragm vibrates. In the embodiment of FIG. 6, apertures 26" are defined at least partially in the stiffening rib 22" such that the rib assists in urging the air through the apertures. Various other aperture arrangements are contemplated, such as random perforations, porous regions, or the like which enable air or other fluid disposed in the housing chamber to move from one side of the diaphragm to the other without passing fully therearound. Moreover, it is to be appreciated that the above discussed drag reducing techniques of the present invention are also applicable to edge mounted or off center mounted diaphragms.

The invention has been described with reference to the preferred embodiments. Obvious modifications and alterations will occur to others upon reading and understanding the preceding specification. It is intended that the invention be construed as including all such alterations and modifications insofar as they come within the scope of the appended claims or the equivalents thereof.

Having thus described the preferred embodiments, the invention is now claimed to be:

1. A low viscous drag knock sensor comprising:
   a housing defining an interior air filled chamber therein, the housing being operatively connectable with an internal combustion engine to be vibrated in response to engine knock;
   a diaphragm mounting member operatively connected with the housing and disposed in the housing chamber;
   a diaphragm including a central portion, a stiffening rib surrounding the central portion, and an edge portion disposed peripherally around the stiffening rib, the diaphragm central portion being mounted to the diaphragm mounting member, the diaphragm edge portion being supported only by the diaphragm stiffening rib and diaphragm central portion such that the diaphragm edge portion is free to move relative to the housing;
   the diaphragm peripheral edge portion defining a plurality of passages therethrough for reducing drag from air flowing from one side of the diaphragm to another during vibratory displacement thereof, whereby the passages reduce a resonant frequency bandwidth of the diaphragm; and,
   a transducer for providing an electrical output signal which varies with sensed vibratory displacement, said transducer being operatively connected to the diaphragm central portion to produce an output electrical signal which varies with vibratory displacement thereof.

2. The knock sensor as set forth in claim 1 wherein the passages are disposed symmetrically in a ring around the diaphragm peripheral edge portion.

3. The knock sensor as set forth in claim 1 wherein the passages have a combined surface area of 5-10% of the diaphragm edge portion.

4. The knock sensor as set forth in claim 1 wherein the diaphragm peripheral edge portion includes a rounded outermost peripheral edge to provide for smooth air flow thereover.

5. The knock sensor as set forth in claim 1 wherein the passages include a plurality of elongated slots.

6. The knock sensor as set forth in claim 1 wherein the housing includes electrical connection elements mounted thereon, one of the electrical connection elements being operatively connected with the diaphragm, the diaphragm being electrically connected with a first face of said transducer, and another of the electrical connection elements being operatively connected with a second face of said transducer.

7. The knock sensor as set forth in claim 6 wherein a wire extending from one of the electrical connection elements is soldered to the diaphragm peripheral rib.

8. A vibration sensor which has a resonant frequency in the range of 5 to 9 kilohertz and a bandwidth in the range of 70–200 hertz, the bandwidth being defined at a 3 decibel drop from an electrical signal output at the resonance frequency, the vibration sensor comprising:
   a housing defining an interior chamber therein;
   a diaphragm having a natural resonant frequency of at least 5 kilohertz and less than 9 kilohertz and a natural bandwidth around the resonant frequency which is greater than 200 hertz, the diaphragm including a diaphragm central portion and a diaphragm edge portion disposed radially outward therefrom, the diaphragm central portion being mounted in the housing chamber with the diaphragm edge portion supported only by the diaphragm central portion such that the diaphragm edge portion is free to undergo vibratory displacement;
   a bandwidth reducing means for reducing the natural diaphragm bandwidth to between 70 to 200 hertz by reducing drag from air flow flowing from one side of the diaphragm to another during vibratory displacement thereof; and,
   a sensing means for sensing the vibratory displacement of the diaphragm and providing an electrical output signal indicative thereof.

9. The vibration sensor as set forth in claim 8 wherein the bandwidth reducing means includes a rounded outer diaphragm peipheral edge for smoother air flow thereover.

10. The vibration sensor as set forth in claim 8 wherein the bandwidth reducing means includes a plurality of apertures defined in the diaphragm edge portion.

11. The vibration sensor as set forth in claim 8 wherein the diaphragm further includes a stiffening rib for selecting the natural resonant frequency.

12. the vibration sensor as set forth in claim 8 wherein the sensing means includes a piezoelectrical element disposed in association with the diaphragm central portion to be physically distorted by displacement of the diaphragm during vibratory displacement.

13. A knock sensor which has a resonant frequency in the range of 5 to 9 kilohertz and a bandwidth less than 200 hertz, the bandwidth being defined at a 3 decibel drop from an electrical signal output at the resonance frequency, the sensor comprising:
   a housing defining an interior chamber therein;
   a diaphragm having a natural resonant frequency of at least 5 kilohertz and less than 9 kilohertz and a natural bandwidth around the resonant frequency which is greater than 200 hertz, the diaphragm including a diaphragm first portion and a diaphragm edge portion disposed radially outward therefrom, the diaphragm first portion being mounted in the housing chamber with the diaphragm edge portion supported only by the diaphragm first portion such that the diaphragm edge portion is free to undergo vibratory displacement;

a plurality of passages defined through the diaphragm edge portion, the passages having a sufficient open cross section that the bandwidth is reduced from the natural diaphragm bandwidth to less than 200 hertz by reducing drag from air flow flowing from one side of the diaphragm to another during vibratory displacement thereof; and, a sensing means for sensing the vibratory displacement of the diaphragm and providing the electrical output signal which is indicative thereof.

14. A method of sensing engine knock, the method comprising:

mounting a diaphragm which has a natural resonant frequency in the range of 5 to 9 kilohertz in an internal chamber of a housing and mounting the housing in association with an internal combustion engine such that the diaphragm is vibrated therewith, the diaphragm undergoing resonant displacement over a frequency bandwidth around the resonant frequency;

monitoring the amplitude of the diaphragm displacement and providing an electrical output signal which varies therewith;

as the diaphragm undergoes resonant displacement, air adjacent one side of the diaphragm is displaced and moved to the other side of the diaphragm;

providing a sufficient plurality of passages through the diaphragm to reduce viscous drag caused by the displacement of air from one side of the diaphragm to the other side, the plurality of passages having a sufficient cross section that the bandwidth at which there is a 3 decibel drop in the electrical output signal relative to the resonant frequency electrical output signal is less than 200 hertz.

* * * * *